UNITED STATES PATENT OFFICE.

HUGO WOLFF, OF MANNHEIM, GERMANY, ASSIGNOR TO BADISCHE ANILIN & SODA FABRIK, OF LUDWIGSHAFEN-ON-THE-RHINE, GERMANY, A CORPORATION.

BLUE-GREEN VAT COLORING-MATTER.

1,054,888.　　　Specification of Letters Patent.　Patented Mar. 4, 1913.

No Drawing.　　Application filed December 9, 1911.　Serial No. 664,856.

*To all whom it may concern:*

Be it known that I, HUGO WOLFF, subject of the Grand Duke of Baden, residing at Mannheim, Germany, have invented new and useful Improvements in Blue-Green Vat Coloring-Matter, of which the following is a specification.

By nitrating the methyl-benzanthron having a melting point of 199° C. (which is described in the specification of German Patent No. 200,835) a mononitro-methyl-benzanthron of a melting point of 243° C. can be obtained.

According to this invention mononitro-methyl-benzanthron is heated with sulfur whereby coloring matter is obtained which dyes cotton, from the vat, valuable fast blue-green shades.

The following is an example of how my invention can be carried into practical effect, but the invention is not confined to this example. The parts are by weight.

Mix well together 10 parts of mononitro-methyl-benzanthron and 40 parts of sulfur, and heat the mixture at a temperature of from 220-240° C. until the evolution of sulfureted hydrogen ceases. When the melt is cold, powder it and extract with hot sodium sulfid solution, or with carbon bisulfid, in order to remove excess of sulfur. The coloring matter is a dark brown powder which can be made into a paste by dissolving it in concentrated sulfuric acid and then precipitating by means of water. This yields a blue vat with alkaline hydrosulfite and the blue shades at first obtained on cotton from this vat become, on washing and drying, fast blue-green shades. The pure dry coloring matter contains sulfur and is a dark powder with a metallic luster and yields a brown-red solution in concentrated sulfuric acid and a dull violet solution in 23% fuming sulfuric acid. It is very difficultly soluble in organic solvents. When pure, it yields a green solution in nitrobenzene and can be re-crystallized from this solvent. In an impure state, it generally exhibits a brown-red fluorescence in nitrobenzene. In this example, the proportion of the ingredients and also the time and temperature of treatment can be considerably varied without departing from the nature of my invention.

Now what I claim is:—

The new coloring matter which can be obtained by heating mononitro-methyl-benzanthron with sulfur, which coloring matter contains sulfur and consists, when dry, of a dark brown powder with a metallic luster, which yields a brown-red solution in concentrated sulfuric acid, a dull violet solution in 23% fuming sulfuric acid, a green solution in nitrobenzene, and which dyes cotton from the vat fast blue-green shades.

In testimony whereof I have hereunto set my hand in the presence of two subscribing witnesses.

HUGO WOLFF.

Witnesses:
　J. ALEC. LLOYD,
　A. O. TITTMANN.